(No Model.)
J. F. KELLY.
ARMATURE FOR DYNAMOS.
No. 381,700. Patented Apr. 24, 1888.
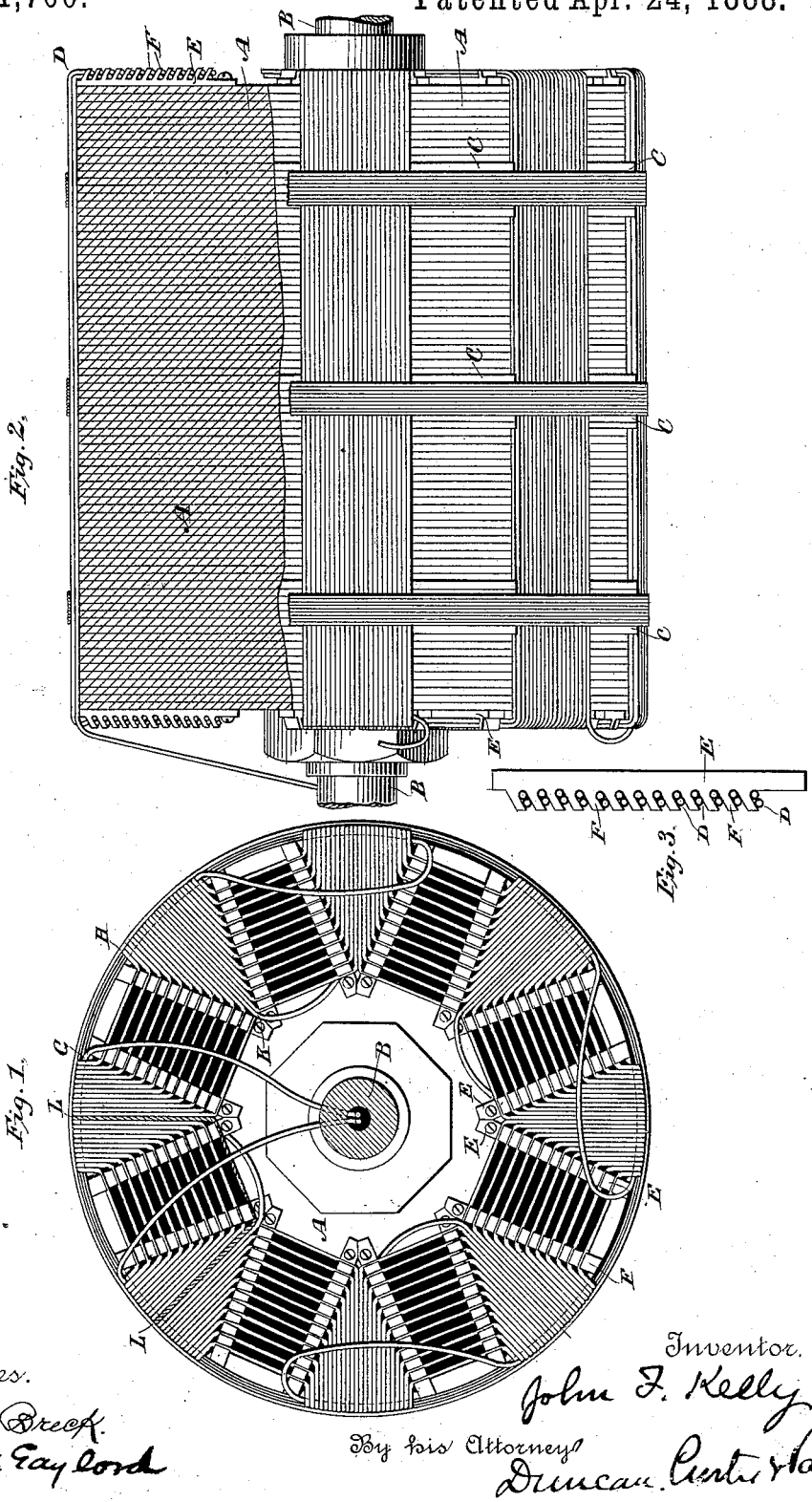
Witnesses.
Geo. W. Breck.
Robt. F. Gaylord.
Inventor.
John F. Kelly
By his Attorneys
Duncan Curtis & Page

UNITED STATES PATENT OFFICE.

JOHN F. KELLY, OF NEW YORK, N. Y., ASSIGNOR TO THE UNITED STATES ELECTRIC LIGHTING COMPANY, OF SAME PLACE.

ARMATURE FOR DYNAMOS.

SPECIFICATION forming part of Letters Patent No. 381,700, dated April 24, 1888.

Application filed October 17, 1887. Serial No. 252,539. (No model.)

*To all whom it may concern:*

Be it known that I, JOHN F. KELLY, a citizen of the United States, residing at New York, in the county and State of New York, have invented certain new and useful Improvements in Magneto or Dynamo Electric Machines, of which the following is a specification, reference being had to the accompanying drawings.

My invention is an improvement in the armatures of magneto or dynamo electric machines; and it consists in the combination, with the cores and coils thereof, of certain new and improved devices for facilitating the winding and improving the construction of the machine as a whole.

The most common forms of dynamo or magneto electric machines with cylindrical armatures have the conductors wound parallel to the axis and carried across the ends of the core. Others, however, have longitudinal projections or ribs, around which the coils are wound without crossing the ends of the core. This principle is modified by dispensing partially or wholly with the ribs and carrying the wires of each coil around a single stop or projection at opposite ends of the core. This has the disadvantage of increasing the length and bulk of the armature by forming a mass or bunch of superposed wires around or under each projection. It has other objections which, it will be seen by the description below, I have aimed to avoid.

In my improved armature I practically dispense with all pole-pieces and the above-described projections, and in lieu thereof I employ at the end of the core rows or series of insulating cleats, stops, or guides, and instead of carrying the entire coil around one stop I wind only a limited number of convolutions— say one or two—around each stop, so that the coils are spread out over the end of the core. The coils are thus not only made to occupy less space in the line of the axis and to present a neater and better appearance, but are better insulated and may be more perfectly wound.

The character of the insulating-stops employed may be greatly varied, a convenient device being made of a wooden block or strip in which the requisite number of cross-grooves are cut, each groove being adapted to receive and retain one or two wires, according to the number of convolutions desired. These strips are secured to the ends of cores in parallel pairs, or nearly so, by screws or otherwise, and the wires wound through them, as hereinafter described.

Referring to the drawings, Figure 1 is an end view of an armature. Fig. 2 is a side elevation of the same. Fig. 3 is a detail of one of the strips.

A is a cylindrical core, formed, usually, of a number of iron disks or plates insulated by sheets of paper. The plates are strung on a shaft, B, and properly secured. The core may be recessed longitudinally for the reception of the coils; but I prefer to use a nearly plain cylinder containing a few plates having polar projections, and these are grouped at intervals, so that their polar projections will act as guides to maintain the coils in place and to assist in winding. Plates provided with slight polar projections between the coils are shown at C C.

In the present case the armature carries eight coils, and is adapted to be used with ordinary and well-known multiple field-magnets. In practice each coil is wound independently and all the coils are then connected up in series.

The plan of winding and the improvements which I have devised are as follows: At the ends of the cores I provide rows or lines of stops or guides, and I make them by cutting serrations or cross-grooves in wooden slats, as shown in Fig. 3, where E is one of the slats, and F F the serrations or notches constituting the guides or stops. These slats are secured to the ends of the core in the most convenient positions for carrying the wires through them from one coil-space to the next without crossing the wires, and so that the convolutions of each coil will lie closely and form a smooth and even coil. The first coil is then formed by winding the insulated wire D, beginning at G, along the core and under the upper pair of stops at the end of the core, and then back to H. It is then carried under or through the upper pair of stops between H and G and in the same way through the second pair of stops at each end of the core, and so on until the coil is completed, its end being at K. Instead of carrying the wire but once through each pair of guides, it is obvious that it may be carried two or three times, either to form convolutions superposed or side by side. I prefer to wind the conductor twice through each guide and form superposed convolutions. When all the coils are thus formed, they are connected up end to end in such manner that the currents developed will be in the same direction in all the coils at any given time. The proper ends of two adjacent coils are carried through the shaft B to two insulated metal rings, which form the terminals or collector, as is common in alternating machines.

Between the two coils last mentioned, which are designated the "first" and "last" coils, there exists the greatest difference of potential, and as in some machines this difference is very great, I provide a means for protecting the machine against injury by omitting to wind the last one or two convolutions of the first or last coil and filling the space thus left with a cotton cord, L, of the same diameter as the wire. This preserves the symmetry of the coils and insulates more perfectly the two terminal coils from one another.

I do not limit myself to any special form of field-magnet nor the particular construction of the core, and I regard any arrangement of stops or guides when used to spread the wires out at the ends of the cores in the manner herein set forth as broadly within the scope of my invention, whatever may be the particular construction of the said guides.

I am aware of the invention by Moritz A. Müller of steel pins with insulated caps or sleeves, described in an application of even date herewith and designed to be used in place of the notched slats herein described, and I do not claim this special form of stop; but

What I claim is—

1. The combination, with the cylindrical armature-core of a magneto or dynamo electric machine, of rows or series of cleats, stops, or guides located at the ends of the core, substantially as described, and insulated conductors wound longitudinally upon the core and around or through the stops or guides, as set forth.

2. The combination, with the cylindrical armature-core of a magneto or dynamo electric machine, of the serrated or notched slats or strips, E, of insulating material secured to the ends of the core, and conductors wound longitudinally upon the sides of the core and carried through the notches in the slats from one coil-space to another, as herein set forth.

JOHN F. KELLY.

Witnesses:
S. PERIT RAWLE,
PARKER W. PAGE.